(12) United States Patent
Na et al.

(10) Patent No.: US 9,398,601 B2
(45) Date of Patent: Jul. 19, 2016

(54) METHOD AND APPARATUS FOR SCHEDULING IN CELLULAR BASED DEVICE TO DEVICE COMMUNICATION

(71) Applicant: Electronics and Telecommunications Research Institute, Daejeon (KR)

(72) Inventors: Jee Hyeon Na, Daejeon (KR); Jung Mo Moon, Daejeon (KR); Dae Ik Kim, Daejeon (KR); Sang Ho Lee, Daejeon (KR); Woo Goo Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 302 days.

(21) Appl. No.: 14/097,949

(22) Filed: Dec. 5, 2013

(65) Prior Publication Data
US 2014/0162668 A1 Jun. 12, 2014

(30) Foreign Application Priority Data
Dec. 6, 2012 (KR) ........................ 10-2012-0140784

(51) Int. Cl.
*H04W 72/00* (2009.01)
*H04W 72/12* (2009.01)

(52) U.S. Cl.
CPC .................................. *H04W 72/121* (2013.01)

(58) Field of Classification Search
CPC .................................................... H04W 72/04
USPC ............ 455/450, 452.2, 452.1, 501, 445, 423
See application file for complete search history.

(56) References Cited

U.S. PATENT DOCUMENTS

| | | | | |
|---|---|---|---|---|
| 9,185,599 B2* | 11/2015 | Nam | ...................... | H04B 7/024 |
| 2008/0298318 A1* | 12/2008 | Lee | ........................ | H04W 28/24 370/329 |
| 2010/0093364 A1* | 4/2010 | Ribeiro | ............... | H04W 72/082 455/452.2 |
| 2011/0312331 A1* | 12/2011 | Hakola | ............... | H04W 72/085 455/452.2 |
| 2012/0265818 A1* | 10/2012 | Van Phan | .............. | H04W 8/005 709/204 |

FOREIGN PATENT DOCUMENTS

KR     1020110089311    8/2011

* cited by examiner

*Primary Examiner* — David Q Nguyen
(74) *Attorney, Agent, or Firm* — Nelson Mullins Riley & Scarborough LLP; Anthony A. Laurentano (57) ABSTRACT

Disclosed is a method and apparatus for scheduling in a cellular-based device-to-device (D2D) communication. The method of scheduling a cellular resource used in a base station for a D2D communication between terminals may include grouping, by a proximity coordinator, a cellular resource of an adjacent base station based on cell information of a base station, managing a resource to be allocated to the terminal and a resource allocated previously to the terminal based on the grouped resource, and allocating the grouped resource to the terminal based on information associated with the resource to be allocated and the previously allocated resource when a request for D2D communication between terminals located in different cells is received.

13 Claims, 12 Drawing Sheets

| Cell A ID 810 | Cell B ID 820 | RG ID 830 | D2D Pair Info List 840 ||
|---|---|---|---|---|
| | | | Number of Pair 842 | Pair Information 844 |
| 1 | 2 | 3 | 0 | (Pair, QoS, Scheduled Resource,...) |
| | 3 | 2 | 1 | (Pair, QoS, Scheduled Resource,...) |
| | 4 | 1 | 10 | (Pair, QoS, Scheduled Resource,...) |
| | 2 | 3 | 2 | (Pair, QoS, Scheduled Resource,...) |
| | 6 | 2 | ... | |
| | 7 | 1 | | |
| 2 | 1 | 3 | | |
| | 3 | 1 | | |
| | 7 | 2 | | |
| | 8 | 1 | | |
| | 9 | 3 | | |
| | 10 | 2 | | |
| ..... | ..... | ..... | ..... | ..... |

FIG. 8B

| Cell ID 850 | Resource GroupID 860 | Resource Allocation Information 870 |
|---|---|---|
| 1 | RG1 | Allocated amount(Number of RBs), Allocation location information (Time/frequency), ... |
| 1 | RG2 | Allocated amount(Number of RBs), Allocation location information (Time/frequency), ... |
| 1 | RG3 | Allocated amount(Number of RBs), Allocation location information (Time/frequency), ... |
| 2 | RG1 | Allocated amount(Number of RBs), Allocation location information (Time/frequency), ... |
| 2 | RG2 | Allocated amount(Number of RBs), Allocation location information (Time/frequency), ... |
| 2 | RG3 | Allocated amount(Number of RBs), Allocation location information (Time/frequency), ... |
| ..... | ..... | ..... |

METHOD AND APPARATUS FOR SCHEDULING IN CELLULAR BASED DEVICE TO DEVICE COMMUNICATION

CROSS-REFERENCE TO RELATED APPLICATION

This application claims the priority to and the benefit of Korean Patent Application No. 10-2012-0140784, filed on Dec. 6, 2012, in the Korean Intellectual Property Office, the disclosure of which is incorporated herein by reference.

BACKGROUND

1. Field of the Invention

Exemplary embodiments relate to a method and apparatus for scheduling in a cellular-based device-to-device (D2D) communication that may provide scheduling of a resource used in a direct communication service between terminals using a cellular resource.

2. Description of the Related Art

Device-to-device (D2D) communication in a conventional wireless communication system has been implemented through infrastructure. A D2D communication technology involves a direct communication between terminals through going through infrastructure such as a base station, an access point (AP), and the like, and has been studied separately in the fields of proximate terminal discovery for D2D communication and communication between proximate terminals. Based on a wireless access technology, wireless fidelity (WiFi), Bluetooth, and the like, may be used, and a cellular mobile communication may be used. Because a D2D communication using an unlicensed band such as WiFi or Bluetooth is difficult to provide a scheduled and controlled service and may degrade rapidly due to interference, studies have been conducted on a D2D communication using a cellular mobile communication on a licensed band.

A D2D communication technology using a cellular mobile communication may use a radio resource used in a mobile communication network, and for this, a method in which a mobile base station allocates a resource for a D2D communication may be used.

As an example of a D2D communication, reference may be made to Korean Patent Publication No. 10-2009-0062435, published on Jun. 17, 2009, titled "Method and system for allocating resource for peer to peer communication in wireless communication system", that may receive a peer-to-peer (P2P) communication terminal and a mobile communication resource allocation information from a base station, may scan the presence or absence of a mobile communication terminal adjacent to the P2P communication terminal using the resource allocation information, may request a P2P communication resource by transmitting a result of the scan to the base station, and may receive P2P communication resource allocation information in response to the resource request.

However, when terminals that desire to execute a direct communication belong to the same base station, this method may transmit allocated resource information to the terminals easily, but when the terminals that desire to execute a direct communication belong to different base stations, may not allocate a cellular resource efficiently.

Also, in a case of a D2D communication between terminals belonging to different cells, because a more robust modulation and coding scheme is used in consideration of passing through a cell due to a high probability that the terminal is located in the cell boundary, performance relative to an allocated radio resource may be lowered.

Accordingly, there is a demand for a method of supporting a D2D communication between terminals located in difference cells without passing through a cell.

SUMMARY

An aspect of the present invention provides a method and apparatus for scheduling in a cellular-based device-to-device (D2D) communication that may allocate a resource for a D2D communication between terminals accessing a single (same) base station or adjacent base stations.

Another aspect of the present invention also provides a method and apparatus for scheduling in a cellular-based D2D communication that may manage and allocate a resource for a D2D communication efficiently.

Still another aspect of the present invention also provides a method and apparatus for scheduling in a cellular-based D2D communication that may enable a D2D communication between terminals located in a cell boundary to be executed without passing through a base station.

According to an aspect of the present invention, there is provided a method of scheduling a cellular resource used in a base station for a D2D communication between terminals, the scheduling method including grouping, by a proximity coordinator, a cellular resource of an adjacent base station based on cell information of a base station, managing a resource to be allocated to the terminal and a resource allocated previously to the terminal based on the grouped resource, and allocating the grouped resource to the terminal based on information associated with the resource to be allocated and the previously allocated resource when a request for D2D communication between terminals located in different cells is received.

The D2D communication may correspond to a D2D communication between terminals accessing different base stations using a cellular mobile communication.

The grouped resource may be reused based on location information of the cell without monitoring proximity between the terminals.

The grouped resource may be managed separately from a resource used in the cell.

The grouped resource may be changed at a preset cycle with the resource used in the cell.

The resource to be allocated may be managed based on an inter-cell scheduling resource information table including an identification (ID) of the cell, an ID of a cell adjacent to the cell, a resource group ID available between the cells, and information associated with a pair of terminals executing the D2D communication.

The allocated resource may be managed based on a resource allocation information table including information associated with an allocated resource per the resource group ID for the cell ID.

The information associated with the allocated resource may be transmitted to the corresponding terminal when the proximity coordinator operates initially or the information associated with the allocated resource is changed.

The information associated with the allocated resource may be transmitted to the base station when a setup information request is received from the corresponding base station.

The scheduling method may further include, after the allocating, transmitting the information associated with the allocated resource to the base station accessed by the terminal executing the D2D communication.

According to another aspect of the present invention, there is provided a method of scheduling a cellular resource used in a base station for a D2D communication between terminals, the scheduling method including determining whether a D2D communication between terminals in adjacent base stations is feasible, verifying whether the terminals belong to a cell of the base station when the D2D communication between the terminals in the adjacent base stations is feasible, requesting resource allocation for the D2D communication between the terminals from the proximity coordinator when one of the terminals is determined to belong to a cell of a different base station, and allocating a resource to the corresponding terminal based on resource allocation information received from the proximity coordinator.

According to still another aspect of the present invention, there is provided an apparatus for scheduling a cellular resource used in a base station for a D2D communication between terminals, the scheduling apparatus including a resource group management unit to group a cellular resource of an adjacent base station based on cell information of a base station and to manage a resource to be allocated to the terminal and a resource allocated previously to the terminal based on the grouped resource, and a resource group allocation unit to allocate the grouped resource to the terminal based on information associated with the resource to be allocated and the previously allocated resource when a request for D2D communication between terminals located in different cells is received.

According to yet another aspect of the present invention, there is provided a base station for scheduling a cellular resource for a D2D communication between terminals, the base station being operable to determine whether a D2D communication between proximate terminals is feasible, verify whether the terminals belong to a same cell when the D2D communication between the proximate terminals is feasible, request resource allocation for the D2D communication between the terminals from the proximity coordinator when the terminals are determined to fail to belong to the same cell, and allocate a resource to the corresponding terminal based on resource allocation information received from the proximity coordinator.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Figure 1:
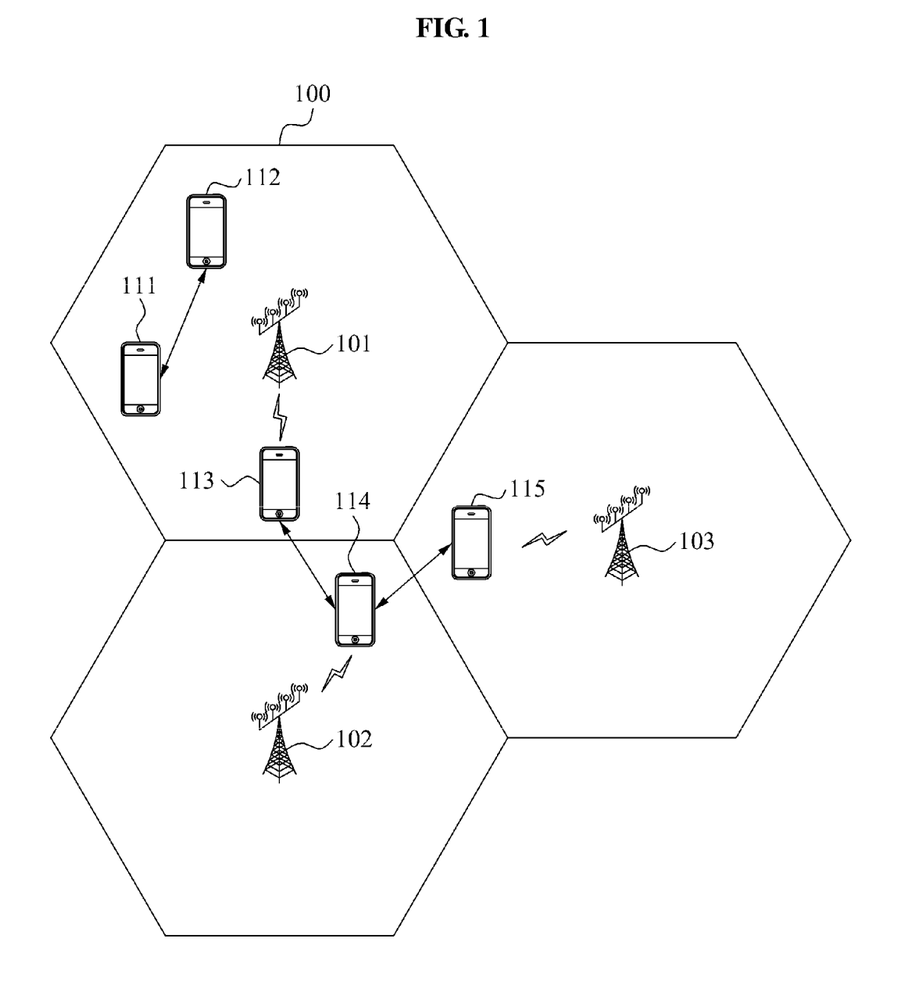
FIG. 1 is a diagram illustrating a device-to-device (D2D) communication using a mobile communication network.

FIG. 1 is a diagram illustrating a device-to-device (D2D) communication using a mobile communication network. Hereinafter, D2D communications between terminals 111, 112, 113, 114, and 115 accessing three base stations 101, 102, and 103 are described with reference to FIG. 1 through an example. In FIG. 1, a hexagonal shape (honeycomb) 100 may represent a cell of each base station.

A first terminal 111 and a second terminal 112 may execute a D2D communication while accessing a first base station 101. A fourth terminal 114 accessing a second base station 102 may execute a D2D communication with a third terminal 113 accessing the first base station 101 or a fifth terminal 115 accessing a third base station 103 by forming a D2D communication pair.

The first terminal 111 and the second terminal 112 accessing the first base station 101 may execute a D2D communication by sharing a cellular resource used in the first base station 101, however when the fourth terminal 114 intends to execute a D2D communication with the third terminal 113 and the fifth terminal 115 belonging to different base stations, a cellular resource for the D2D communication may be shared between three base stations 101, 102, and 103. Accordingly, there is a need for a method of allocating the resource efficiently.

Figure 2:
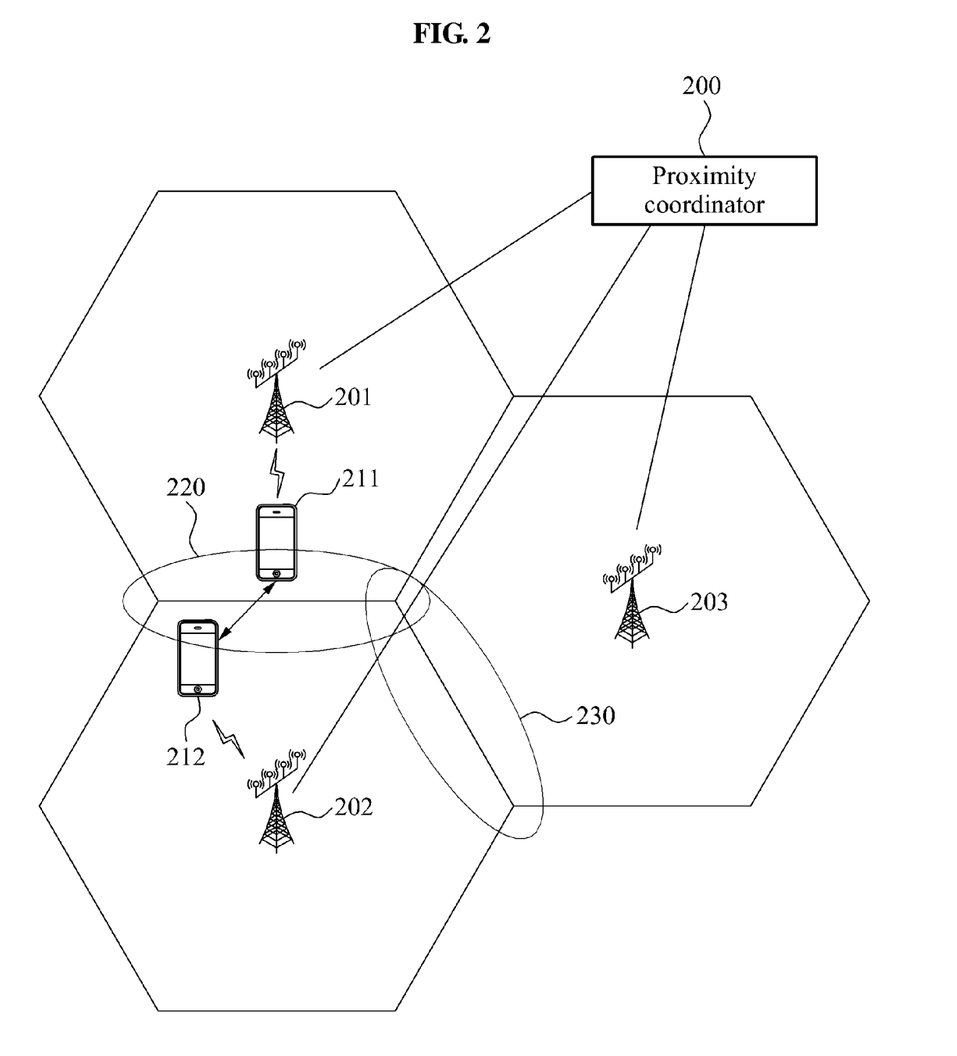
FIG. 2 is a diagram illustrating a structure for efficiently managing a D2D communication between terminals accessing different cells according to an exemplary embodiment.

FIG. 2 is a diagram illustrating a structure for efficiently managing a D2D communication between terminals accessing different cells according to an exemplary embodiment. Referring to FIG. 2, a proximity coordinator 200 may efficiently schedule a D2D communication between terminals accessing different cells.

The proximity coordinator 200 may be connected to a plurality of base stations providing a D2D communication service. Terminals 211 and 212 receiving the D2D service from the base stations 201 and 202 connected to the proximity coordinator 200 may execute a D2D communication between terminals belonging to different cells.

The first terminal 211 accessing the first base station 201 and the second terminal 212 accessing the second base station 202 may execute a D2D communication based on a cellular resource for D2D communication in cell boundaries 220 and 230 that may be allocated and controlled by the proximity coordinator 201 through each base station 201 and 202.

Figure 3:
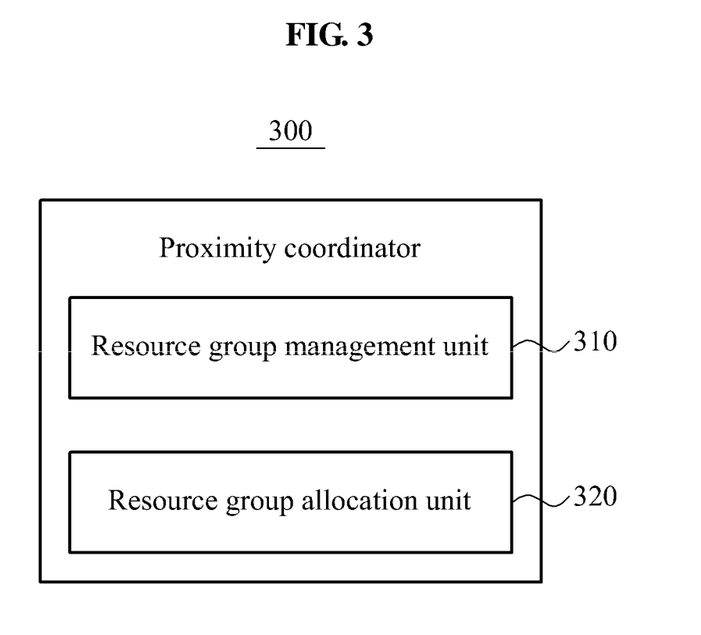
FIG. 3 is a block diagram illustrating a proximity coordinator according to an exemplary embodiment.

FIG. 3 is a block diagram illustrating a proximity coordinator according to an exemplary embodiment. Referring to FIG. 3, the proximity coordinator may include a resource group management unit 310 and a resource group allocation unit 320.

The resource group management unit 310 may group cellular resources of adjacent base stations based on cell information of a base station, and may manage a resource to be allocated to a terminal and a resource allocated previously to a terminal for each grouped resource.

When a request for D2D communication between terminals located in different cells is received, the resource group allocation unit 320 may allocate the grouped resource to the corresponding terminal based on the information associated with the resource to be allocated and the previously allocated resource, and may transmit information associated with the allocated resource to a base station accessed by the terminal executing the D2D communication. In a case in which the proximity coordinator operates initially or the information associated with the allocated resource is changed, the resource group allocation unit 320 may transmit the information associated with the allocated resource for each resource group to the corresponding base station. In a case in which a setup information request is received from the base station, the resource group allocation unit 320 may transmit the information associated with the allocated resource for each resource group to the corresponding base station.

In this instance, the grouped resource by the resource group management unit 310 may be reused based on location information of the cell without monitoring proximity between the terminals, and may be managed separately from a resource used in the cell. Also, the grouped resource may be changed periodically at a preset cycle together with the resource used in the cell.

The resource group allocation unit 320 may manage the resource allocated to the terminal based on an inter-cell scheduling resource information table including an identification (ID) of the cell, an ID of a cell adjacent to the cell, a resource group ID available between the cells, and information associated with a pair of terminals executing a D2D communication, and may manage the resource allocated to the terminal based on a resource allocation information table including information associated with an allocated resource for each resource group ID for the cell ID.

Figure 4:
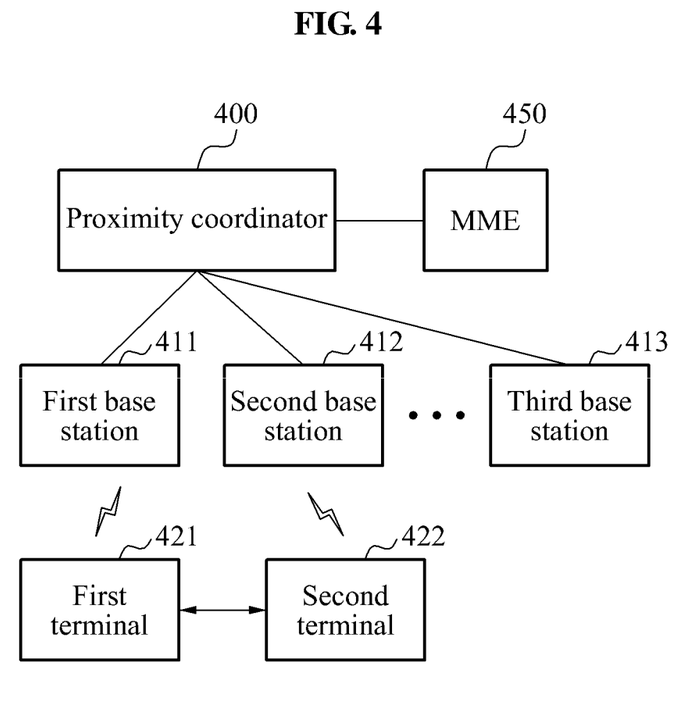
FIGS. 4, 5A and 5B are diagrams illustrating examples of a physical location of a proximity coordinator for a cellular-based D2D communication according to an exemplary embodiment.
Figure 5A:
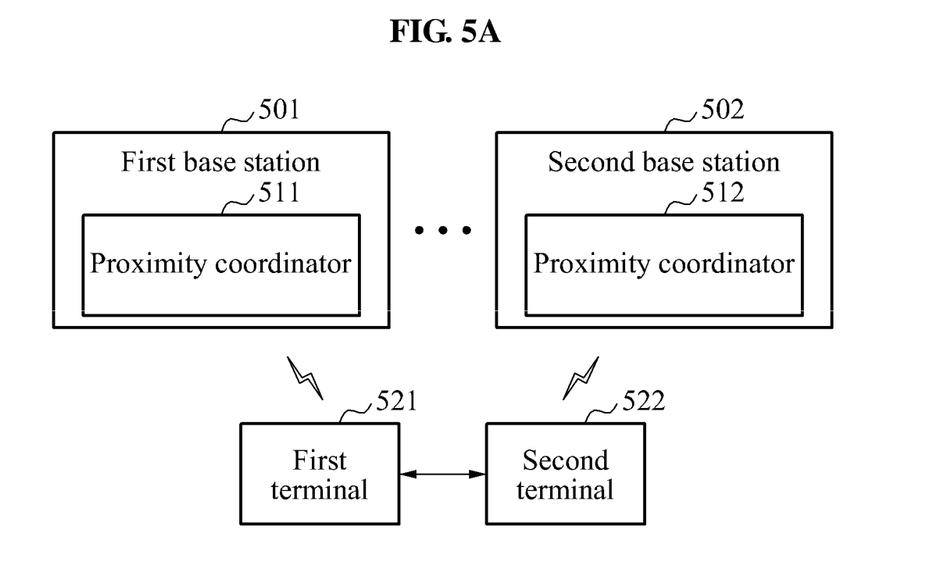
Figure 5B:
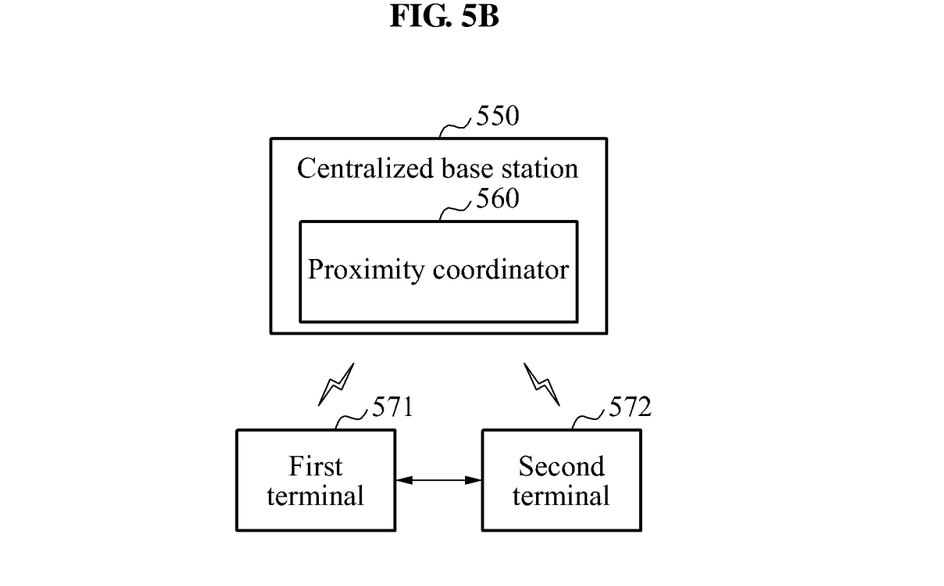

FIGS. 4, 5A and 5B are diagrams illustrating examples of a physical location of a proximity coordinator for a cellular-based D2D communication according to an exemplary embodiment.

Referring to FIG. 4, a proximity coordinator 400 may be located in a physically independent node and may be connected to a plurality of base stations 411, 412, and 413. Also, the proximity coordinator 400 may be connected to a mobility management entity (MME) 450 for controlling the base stations 411, 412, and 413.

When the proximity coordinator 400 is connected to the MME 450, additional procedures such as authority verification for D2D communication and the like may be performed. Also, even though terminals 421 and 422 to which a cellular resource is allocated through the proximity coordinator 400 belong to different cells, the terminals 421 and 422 may execute a D2D communication.

Referring to FIG. 5A, proximity coordinators 511 and 512 may be included in base station 501 and 502, respectively, and may allocate a resource for D2D communication between terminals 521 and 522. Also, in a case in which a radio unit (RU) and a digital unit (DU) are separated like a cloud base station and DUs are centralized in a centralized base station, a proximity coordinator 560 may be located in a centralized base station 550 of a cloud base station to allocate a resource for D2D communication between terminals 571 and 572 as shown in FIG. 5B.

Accordingly, the proximity coordinator may be at any physical location, and may allocate and manage a resource for D2D communication between terminals accessing different cells.

Figure 6:
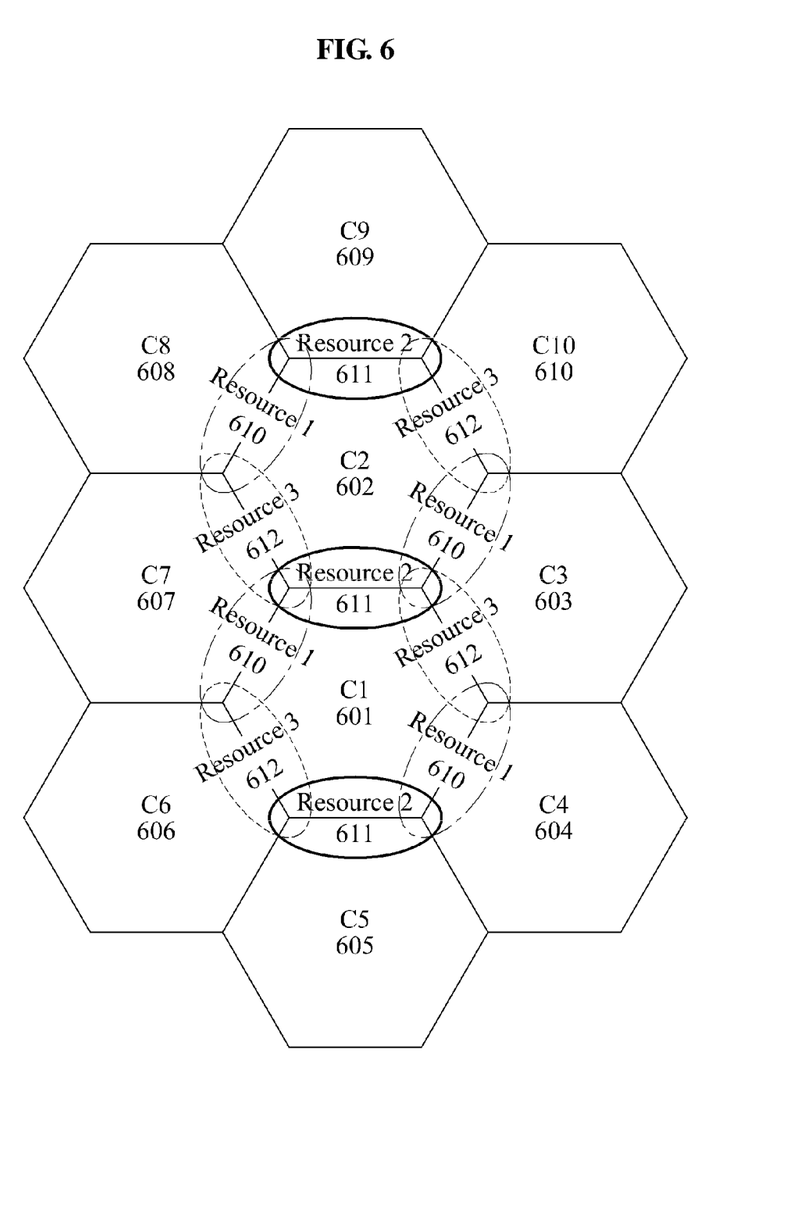
FIG. 6 is a diagram illustrating an example of a process of grouping and reusing a cellular resource by a proximity coordinator in the communication between D2D terminals accessing different cells according to an exemplary embodiment.

FIG. 6 is a diagram illustrating an example of a process of grouping and reusing a cellular resource by a proximity coordinator in the communication between D2D terminals accessing different cells according to an exemplary embodiment. Hereinafter, a method of allocating a resource group differently using only information associated with adjacent cells without monitoring proximity between terminals for resource reuse in a case of a D2D communication between terminals accessing different cells is described with reference to FIG. 6.

The proximity coordinator may group, allocate, and reuse a cellular resource for a D2D communication between terminals accessing different cells. For example, in FIG. 6, a cell C1 601 is illustrated as being surrounded by neighboring cells C2 602, C3 603, C4 604, C5 605, C6 606, and C7 607. In this case, the proximity coordinator may manage a resource of a cell boundary as a resource group for each cell boundary in a distinguishable manner from a resource inside the cell, and may allocate a resource group differently based on adjoining cells. In FIG. 6, three classified resource groups, for example, a first resource, a second resource, and a third resource are illustrated.

The resource inside the cell and in the cell boundary for D2D communication may be changed at a preset cycle, for example, a long cycle. As shown in FIG. 6, when a resource corresponding to a first resource group 610 is allocated to between C1 601 and C7 607, the same first resource group 610 as that of between C1 601 and C7 607 may be allocated to between C1 601 and C4 604 because the between C1 601 and C4 604 is sufficiently distant from the between C1 601 and C7 607. Depending on a location of a cell accessed by a terminal, a resource of a resource group that is separate from a resource inside a cell may be reused for a D2D communication between terminals accessing different cells.

Following this logic, resources of a second resource group 611 used in between C1 601 and C2 602 may be used to terminals executing a D2D communication between C1 601 and C5 605, and resources of a third resource group 612 between C1 601 and C3 603 may be allocated to terminals providing a D2D communication service between C1 601 and C6 606.

Figure 7:
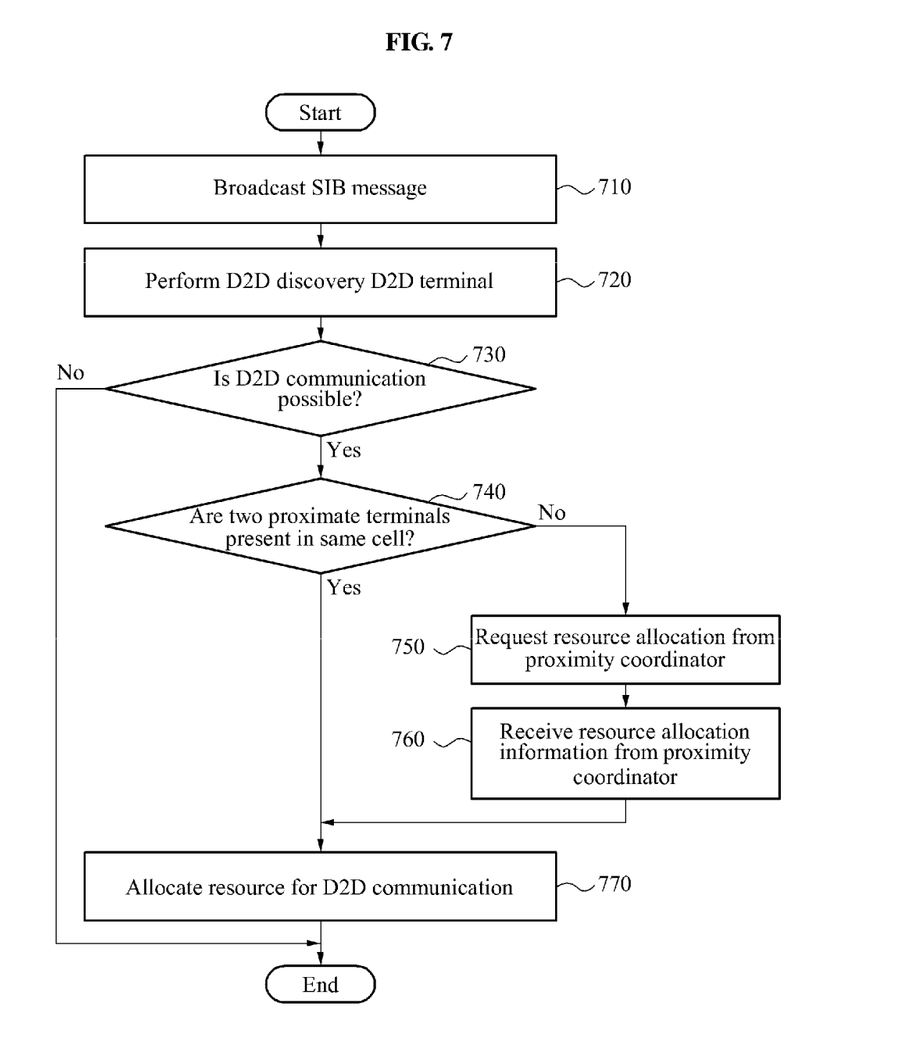
FIG. 7 is a flowchart illustrating a process of setting a cellular-based D2D communication by a base station according to an exemplary embodiment.

FIG. 7 is a flowchart illustrating a process of setting a cellular-based D2D communication by a base station according to an exemplary embodiment.

In operation 710, a base station may broadcast a system information block (SIB) message periodically to inform a capacity of supporting a D2D communication service. In operation 720, when a terminal having a capacity of supporting a D2D communication service accesses the base station, the base station may perform discovery to determine whether a D2D communication with a proximate terminal is feasible. When a D2D communication with a proximate terminal is determined to be feasible as a result of performing the D2D discovery in operation 730, the base station may verify whether the two proximate terminals belong to the same cell in operation 740.

When one of the terminals is determined to belong to a cell of a different base station, that is, when the two proximate terminals are determined to belong to different cells, the base station may request cellular resource allocation from a proximity coordinator in operation 750. When resource allocation information is received from the proximity coordinator in operation 760, the base station may allocate a resource for D2D communication between the terminals accessing different cells based on the resource allocation information in operation 770, which may be notified to the corresponding terminal.

Here, the resource allocation information received from the proximity coordinator may correspond to information associated with a resource allocated to the corresponding terminal among cellular resources of adjacent base stations grouped by the proximity coordinator based on cell information of base stations, and may be reused without monitoring proximity between terminals based on a location of a cell accessed by the corresponding terminal. Also, the resource allocation information received from the proximity coordinator may be managed separately from a resource used in the cell.

When the two terminals executing a D2D communication are determined to be located in the same cell in operation 740, the corresponding base station may dynamically allocate a resource for D2D communication between the two terminals in operation 770, which may be notified to the corresponding terminal. In this instance, in a case of a D2D communication between terminals located in the same cell, the base station may allocate a resource allocated within the cell, and may use a resource allocated for a D2D communication between terminals accessing different cells. Also, in a case in which the resource allocated for a D2D communication between terminals accessing different cells is not used at the time of scheduling, the base station may allocate a resource managed by the proximity coordinator.

Figure 8A:
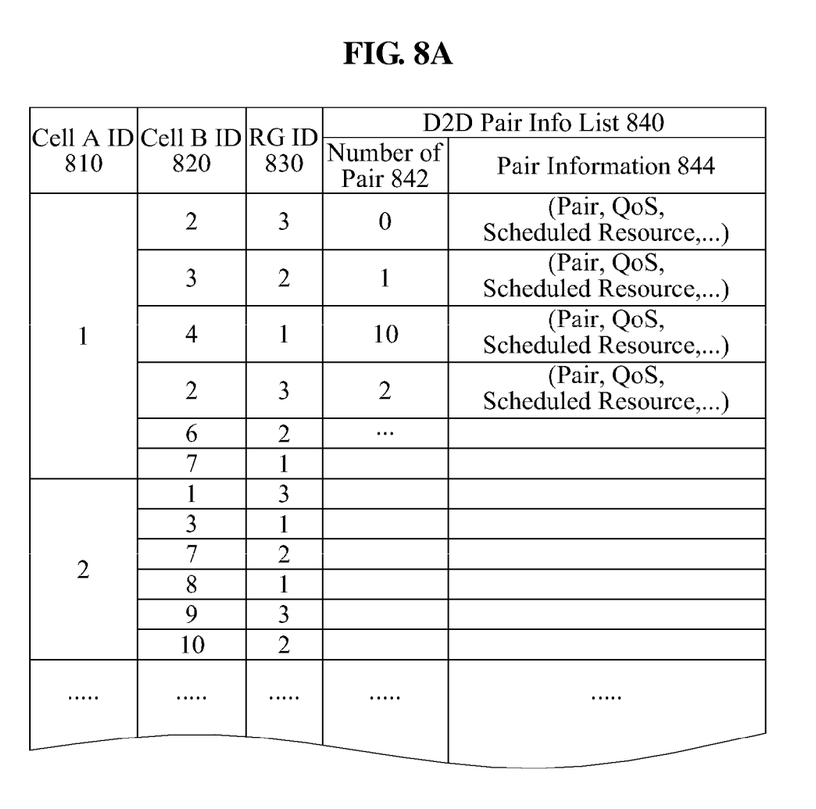
FIGS. 8A and 8B are diagrams illustrating a resource managed by the proximity coordinator of FIG. 7 according to an exemplary embodiment.
Figure 8B:
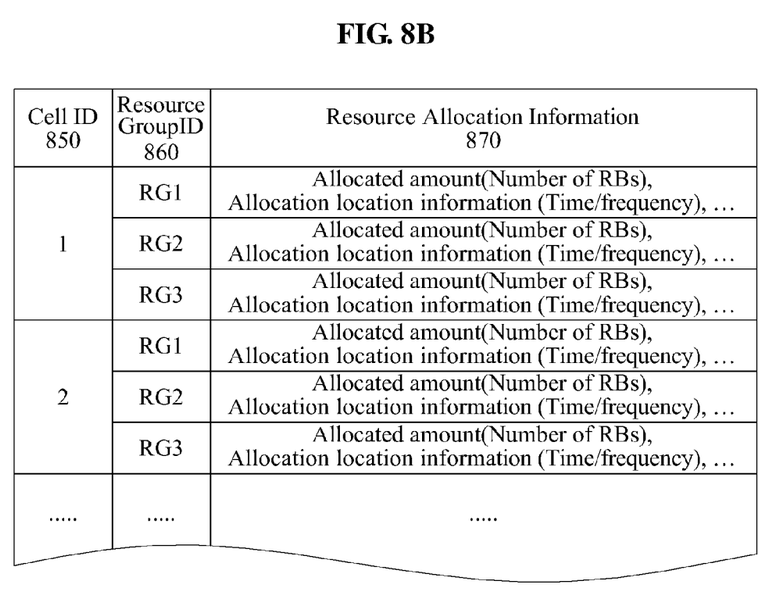

FIGS. 8A and 8B are diagrams illustrating a resource managed by the proximity coordinator of FIG. 7 according to an exemplary embodiment. FIG. 8A illustrates an inter-cell scheduling resource information table for D2D communication between terminals accessing different cells, and FIG. 8B illustrates a resource allocation information table for a resource group.

The proximity coordinator may perform a function of managing and allocating a cellular resource for D2D communication between terminals accessing different cells. For a D2D communication between terminals accessing different cells, The proximity coordinator may manage a resource for each resource group as shown in FIG. 6, and for this, may store information associated with adjacent cells in an inter-cell scheduling resource information table as shown in FIG. 8A.

The inter-cell scheduling resource information table may include a Cell A ID 810 as a center cell ID, a Cell B ID 820 as an adjacent cell ID adjacent to the center cell, a RG ID 830 as a resource group ID available between the cells, and a D2D pair info list 840 as information associated with a pair of terminals being executing a D2D communication in adjacent cells.

The D2D pair info list 840 may correspond to information associated with a pair of terminals executing a D2D communication through accessing different cells, and may include information 842 associated with a number of pairs executing a D2D communication in adjacent cells and information 844 associated with the pairs as much as the number. Here, the information 844 associated with the pairs as much as the number may include a terminal ID, quality of service (QoS) information, and an allocated resource.

As shown in FIG. 8B, the proximity coordinator may manage the resource allocation information table for the resource group. The resource allocation information table may include resource allocation information 870 for each resource group ID 860 for a center cell ID 850. The proximity coordinator may manage information associated with a resource allocated to a terminal for each resource group using the resource allocation information table.

Figure 9:
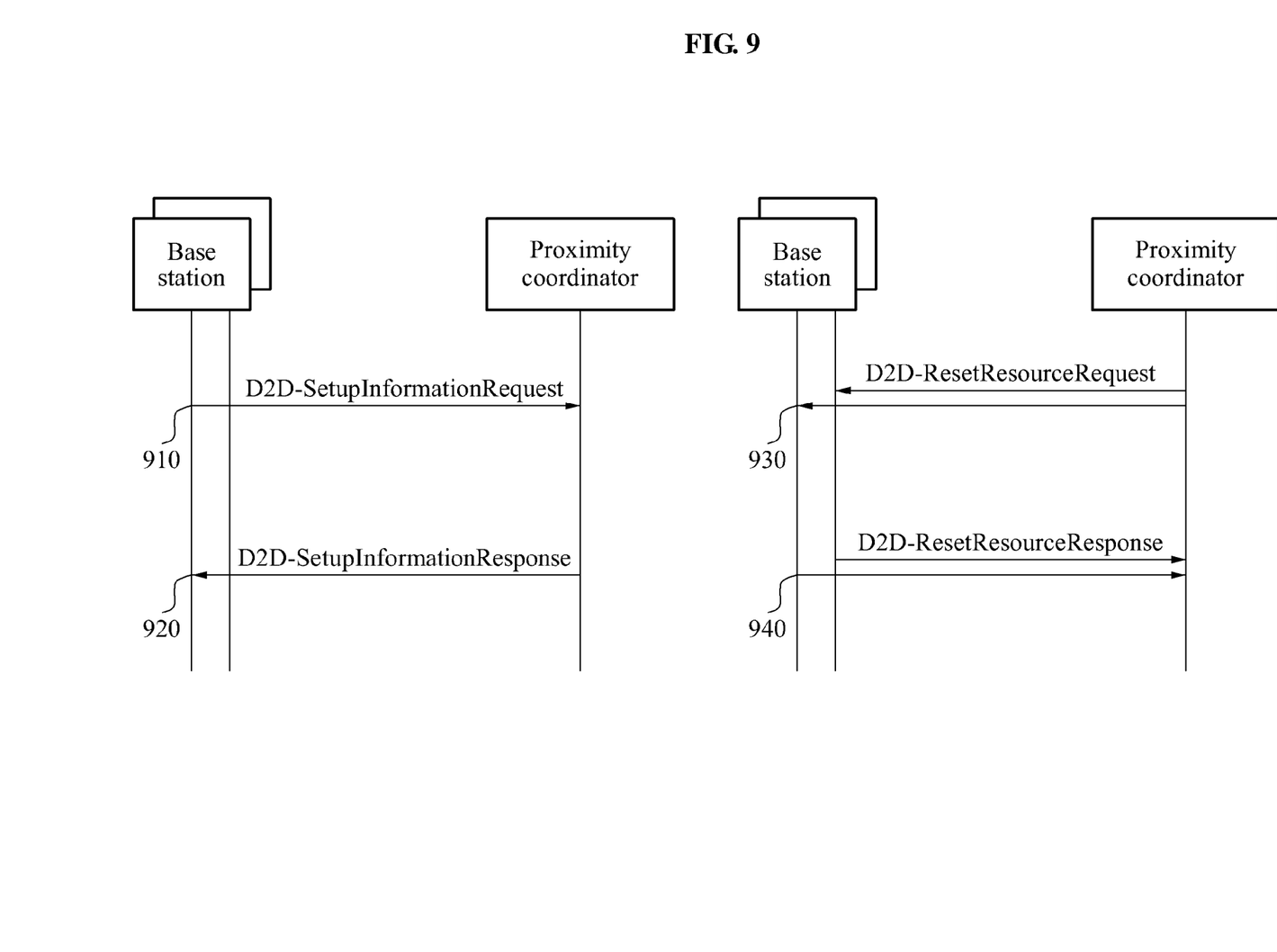
FIG. 9 is a timing diagram illustrating a process of sharing a resource for initial information setting between a proximity coordinator and a base station according to an exemplary embodiment.

FIG. 9 is a timing diagram illustrating a process of sharing a resource for initial information setting between a proximity coordinator and a base station according to an exemplary embodiment. The resource information for D2D communication may be shared by a setup information request transmitted from the base station to the proximity coordinator, and may be shared in such a manner that the proximity coordinator notifies resource information for D2D communication to the base station.

A process of transmitting a resource for D2D communication from a proximity coordinator in response to a request from base stations is described. In operation 910, the base stations connected to the proximity coordinator may transmit a D2D setup information request message to the proximity coordinator to enable a D2D communication between terminals accessing different cells. In operation 920, the proximity coordinator may transmit resource information allocated for each resource group to the corresponding base station through a D2D setup information response message.

A process of a proximity coordinator notifying resource information for D2D communication to base stations is described. This may correspond to a method of resetting resource information for D2D communication of the base stations by the proximity coordinator, and may be used to initialize or change resource information for D2D communication.

In operation 930, when initial setup is completed or resource information for D2D communication between terminals accessing different cells is changed, the proximity coordinator may transmit resource allocation information for each resource group to the corresponding base stations through a D2D reset resource request message. In operation 940, the base station receiving the D2D reset resource request message may notify that the base station received the resource information by transmitting a D2D reset resource response message to the proximity coordinator.

Through these processes, the base stations may reserve a resource for a D2D communication between terminals accessing different cells, and the reserved resource may be used for other purposes only when the reserved resource is not used.

Figure 10:
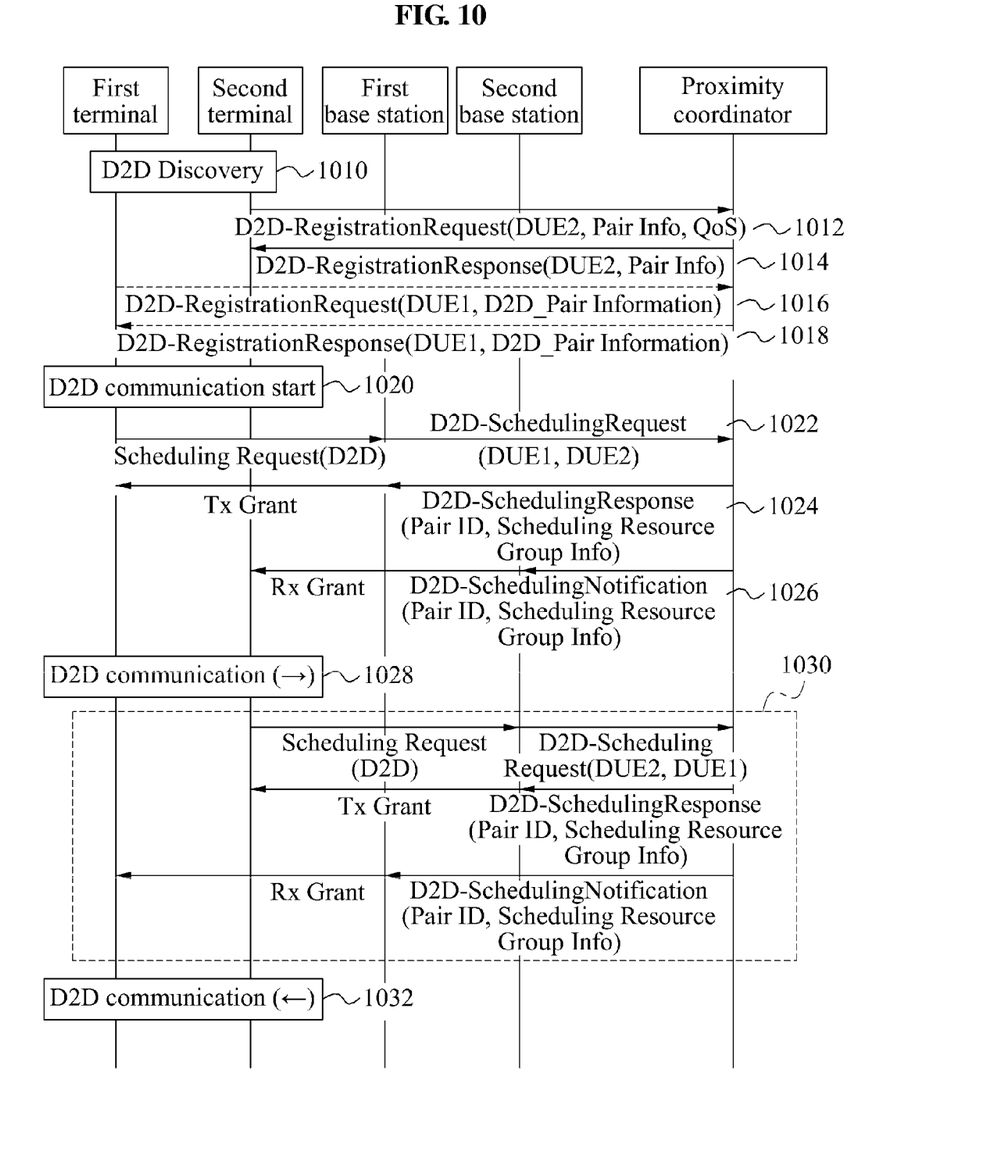
FIG. 10 is a timing diagram illustrating a process of allocating a resource for a D2D communication between terminals located in different cells according to an exemplary embodiment.

FIG. 10 is a timing diagram illustrating a process of allocating a resource for a D2D communication between terminals located in different cells according to an exemplary embodiment.

When a first terminal and a second terminal accessing different cells are discovered by D2D discovery of a base station in operation 1010, the first terminal and the second terminal may notify the presence of a new D2D pair by transmitting a D2D registration request message to a proximity coordinator. In this instance, the message between the terminal and the proximity coordinator may be a non-access stratum (NAS) message.

For example, when the proximity coordinator receives a D2D registration request message from a first terminal in operation 1012, the proximity coordinator may transmit, to the first terminal, a D2D registration response message in response to the D2D registration request message in operation 1014. Similarly, when the proximity coordinator receives a D2D registration request message from a second terminal in operation 1016, the proximity coordinator may transmit, to the second terminal, a D2D registration response message in response to the D2D registration request message in operation 1018.

Hereinafter, a description of a case in which the first terminal intends to start a D2D communication is provided. When the first terminal intends to start a D2D communication with the second terminal in operation 1020, each terminal should be allocated a cellular resource, and for this purpose, the terminal intended to start a D2D communication, that is, the first terminal may transmit a D2D scheduling request message to the proximity coordinator through a base station, for example, a first base station in operation 1022.

When the proximity coordinator receives the D2D scheduling request message, the proximity coordinator may allocate a resource of a corresponding resource group based on a base station accessed by each terminal, that is, the first terminal and the second terminal, and may transmit information associated with resource allocation to the first base station through a D2D scheduling response message, and the first base station may transmit the received resource allocation information to the first terminal in operation 1024. In this instance, the message between the terminal and the base station may be a media access control (MAC) message.

Also, the proximity coordinator may transmit, to the second terminal, cellular resource information allocated to the second terminal through a D2D scheduling notification message, and in this instance, the D2D scheduling notification message may be transmitted to the second terminal through the base station of the receiving terminal, that is, the second base station in operation 1026. When this process is completed, the first terminal may transmit data with the second terminal through the D2D communication with the second terminal using the allocated resource in operation 1028.

Hereinafter, a process 1030 of the second terminal starting the D2D communication with the first terminal is described.

When the second terminal transmits a D2D scheduling request message to the proximity coordinator through the second base station, the proximity coordinator may allocate a resource of a corresponding resource group based on a base station accessed by each terminal, that is, the first terminal and the second terminal, and may transmit information associated with resource allocation to the second base station through a D2D scheduling response message. The second base station may transmit the received resource allocation information to the second terminal. The proximity coordinator may transmit, to the first terminal, cellular resource information allocated to the first terminal through a D2D scheduling notification message, to enable the cellular resource information allocated to the first terminal to be transmitted to the first terminal. When this process is completed, the second terminal may transmit data to the first terminal using the allocated resource in operation 1032, and the first terminal may receive the data transmitted from the second terminal because the first terminal is aware of received resource information.

Figure 11:
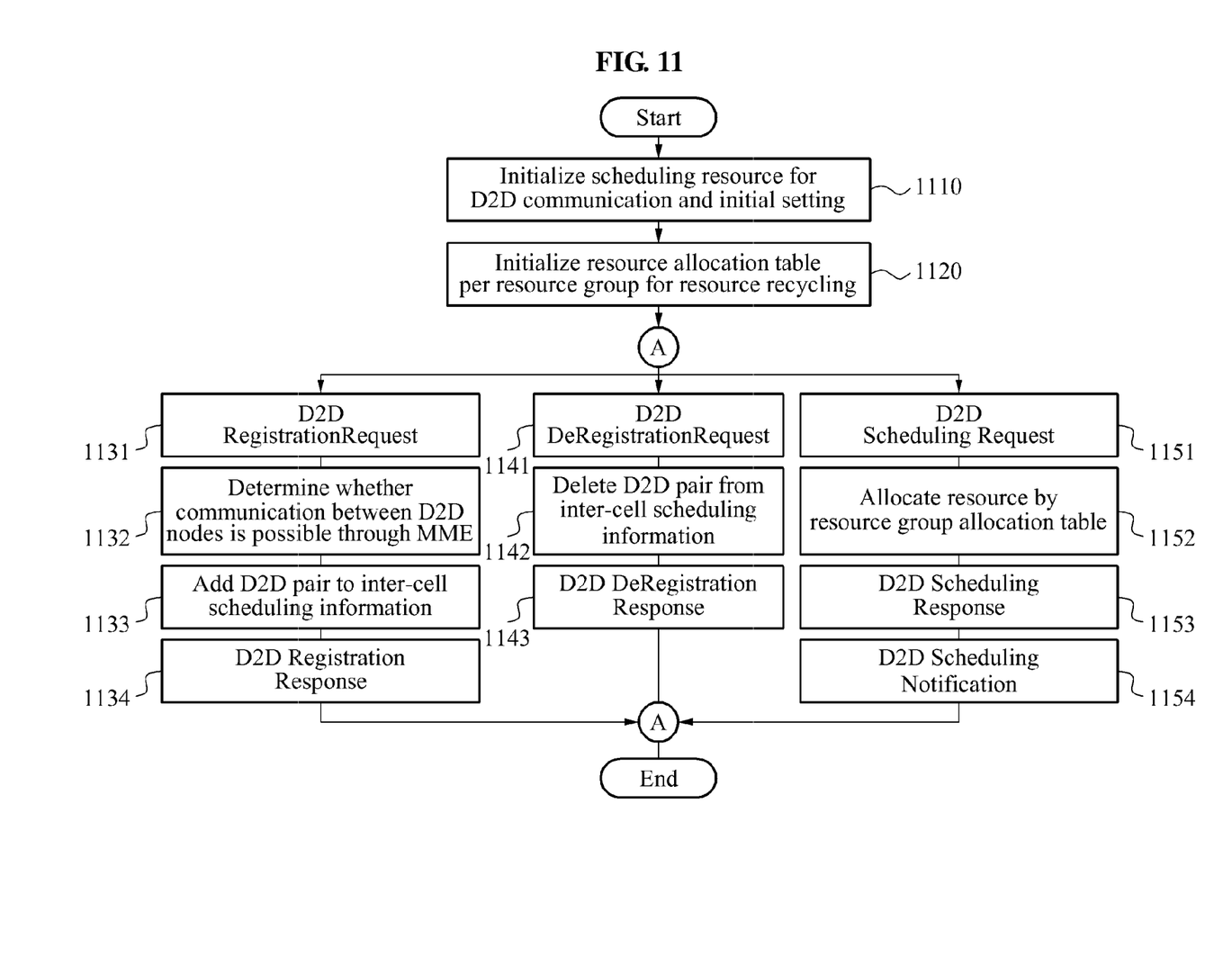
FIG. 11 is a flowchart illustrating a scheduling method for a D2D communication between terminals located in different cells according to an exemplary embodiment.

FIG. 11 is a flowchart illustrating a scheduling method for a D2D communication between terminals located in different cells according to an exemplary embodiment.

In operation 1110, a proximity coordinator may initialize a scheduling resource for D2D communication, and in operation 1020, may initialize a resource allocation table per resource group for resource reuse. This procedure may include resource sharing setting with a base station through the procedure of FIG. 9.

When initialization is completed, the proximity coordinator may be in a state of being able to receive a message, for example, a D2D registration request message, a D2D deregistration request message, and a D2D scheduling request message.

For example, when the proximity coordinator receives a D2D registration request message from a terminal intended to execute a D2D communication in operation 1131, the proximity coordinator may determine whether a communication between D2D nodes is feasible through an MME in operation 1132, may add information associated with a D2D pair to an inter-cell scheduling resource table as shown in FIG. 8 in operation 1133, and may transmit a D2D registration response message to the corresponding terminal in operation 1134.

When the proximity coordinator receives a D2D deregistration request message from the terminal in operation 1141, the proximity coordinator may delete the information associated with the D2D pair from the inter-cell scheduling resource table in operation 1142, and may transmit a D2D deregistration response message to the corresponding terminal in operation 1143.

Also, when the proximity coordinator receives a D2D scheduling request message from the terminal in operation 1151, the proximity coordinator may allocate a resource for the D2D pair based on a resource group allocation table in operation 1152, may transmit a D2D scheduling response message to the terminal transmitting the message in operation 1153, and may transmit a D2D scheduling notification message to the other terminal of the D2D pair in operation 1154. This message processing process may be performed iteratively.

According to the exemplary embodiments, in a case of a D2D communication using a cellular resource, a resource necessary for a D2D communication between terminals located in different cells may be efficiently allocated and managed using a proximity coordinator.

According to the exemplary embodiments, because a resource is grouped and reused based on locations of adjacent cells, a resource for a D2D communication may be efficiently allocated and managed.

According to the exemplary embodiments, as a proximity coordinator enables a D2D communication between terminals located in a cell boundary to be executed, a radio resource may be more efficiently used when compared to a case of passing through a base station.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method of scheduling a cellular resource used in a base station for a device-to-device (D2D) communication between terminals, the scheduling method comprising:
   grouping, by a proximity coordinator, a cellular resource of an adjacent base station based on cell information of a base station;
   managing a resource to be allocated to the terminal and a resource allocated previously to the terminal based on the grouped resource; and
   allocating the grouped resource to the terminal based on information associated with the resource to be allocated and the previously allocated resource when a request for D2D communication between terminals located in different cells is received.

2. The scheduling method of claim 1, wherein the D2D communication corresponds to a D2D communication between terminals accessing different base stations using a cellular mobile communication.

3. The scheduling method of claim 1, wherein the grouped resource is reused based on location information of the cell without monitoring proximity between the terminals.

4. The scheduling method of claim 3, wherein the grouped resource is managed separately from a resource used in the cell.

5. The scheduling method of claim 4, wherein the grouped resource is changed at a preset cycle with the resource used in the cell.

6. The scheduling method of claim 1, wherein the resource to be allocated is managed based on an inter-cell scheduling resource information table including an identification (ID) of the cell, an ID of a cell adjacent to the cell, a resource group ID available between the cells, and information associated with a pair of terminals executing the D2D communication.

7. The scheduling method of claim 6, wherein the allocated resource is managed based on a resource allocation information table including information associated with an allocated resource per the resource group ID for the cell ID.

8. The scheduling method of claim 1, wherein the information associated with the allocated resource is transmitted to the corresponding terminal when the proximity coordinator operates initially or the information associated with the allocated resource is changed.

9. The scheduling method of claim 1, wherein the information associated with the allocated resource is transmitted to the base station when a setup information request is received from the corresponding base station.

10. The scheduling method of claim 1, further comprising:
after the allocating,
transmitting the information associated with the allocated resource to the base station accessed by the terminal executing the D2D communication.

11. An apparatus for scheduling a cellular resource used in a base station for a device-to-device (D2D) communication between terminals, the scheduling apparatus comprising:
a resource group management unit to group a cellular resource of an adjacent base station based on cell information of a base station and to manage a resource to be allocated to the terminal and a resource allocated previously to the terminal based on the grouped resource; and
a resource group allocation unit to allocate the grouped resource to the terminal based on information associated with the resource to be allocated and the previously allocated resource when a request for D2D communication between terminals located in different cells is received.

12. The scheduling apparatus of claim 11, wherein the D2D communication corresponds to a D2D communication between terminals accessing different base stations using a cellular mobile communication.

13. The scheduling apparatus of claim 11, wherein the grouped resource is reused based on location information of the cell without monitoring proximity between the terminals, and is managed separately from a resource used in the cell.

* * * * *